(12) United States Patent
Hosoi et al.

(10) Patent No.: US 11,375,272 B2
(45) Date of Patent: Jun. 28, 2022

(54) VIDEO DISPLAY APPARATUS, METHOD OF CONTROLLING VIDEO DISPLAY APPARATUS, AND RECODING MEDIUM

(71) Applicant: PANASONIC INTELLECTUAL PROPERTY MANAGEMENT CO., LTD., Osaka (JP)

(72) Inventors: Osamu Hosoi, Osaka (JP); Kohei Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/977,693

(22) PCT Filed: Oct. 18, 2019

(86) PCT No.: PCT/JP2019/041158
§ 371 (c)(1),
(2) Date: Sep. 2, 2020

(87) PCT Pub. No.: WO2020/090527
PCT Pub. Date: May 7, 2020

(65) Prior Publication Data
US 2020/0396500 A1    Dec. 17, 2020

(30) Foreign Application Priority Data
Oct. 31, 2018    (JP) .............................. JP2018-205441

(51) Int. Cl.
*H04N 21/436*    (2011.01)
*H04N 21/4363*    (2011.01)

(52) U.S. Cl.
CPC . *H04N 21/43637* (2013.01); *H04N 21/43622* (2013.01); *H04N 21/43635* (2013.01)

(58) Field of Classification Search
None
See application file for complete search history.

(56) References Cited

U.S. PATENT DOCUMENTS

| 10,356,142 B1 * | 7/2019 | Rajagopalan ........... H04L 65/80 |
| 2007/0036158 A1 * | 2/2007 | Hun-Kwon ......... G06F 13/4081 |
| | | 370/389 |

(Continued)

FOREIGN PATENT DOCUMENTS

| JP | 2011-009904 A | 1/2011 |
| JP | 2016-163238 A | 9/2016 |

OTHER PUBLICATIONS

International Search Report and Written Opinion dated Dec. 10, 2019 in International Application No. PCT/JP2019/041158; with partial English translation.

*Primary Examiner* — William J Kim
(74) *Attorney, Agent, or Firm* — McDermott Will & Emery LLP

(57) ABSTRACT

A video display apparatus includes a wireless communicator which receives a video stream from a tuner apparatus via wireless communication, a display which displays a video based on the video stream, an HDMI (registered trademark) connector connected to a source apparatus via an HDMI (registered trademark) cable, and a changer which changes a signal output from an HPD terminal to the source apparatus to a level Lo when the signal output from the HPD terminal is at a level Hi and the video based on the video stream is displayed on the display.

5 Claims, 6 Drawing Sheets

(56) References Cited

U.S. PATENT DOCUMENTS

| | | |
|---|---|---|
| 2010/0333148 A1 | 12/2010 | Musha et al. |
| 2011/0062794 A1* | 3/2011 | Vergoossen .......... H04N 21/436 |
| | | 307/125 |
| 2015/0295600 A1 | 10/2015 | King et al. |
| 2021/0185389 A1* | 6/2021 | Shin ................... H04N 21/4433 |

* cited by examiner

| POWER SUPPLY | SWITCHER | HPD OUTPUT |
|---|---|---|
| ON | VIDEO STREAM INPUT | Lo |
| ON | TMDS SIGNAL INPUT | Hi |
| STANDBY STATE | -- | Hi |

| POWER SUPPLY | SWITCHER | COMMUNICATION BANDWIDTH | HPD OUTPUT |
|---|---|---|---|
| ON | VIDEO STREAM INPUT | NO OVERLAP | Hi |
| ON | VIDEO STREAM INPUT | OVERLAP | Lo |
| ON | VIDEO STREAM INPUT | NO TMDS SIGNAL INPUT | Lo |
| ON | TMDS SIGNAL INPUT | — | Hi |
| STANDBY STATE | — | — | Hi |

VIDEO DISPLAY APPARATUS, METHOD OF CONTROLLING VIDEO DISPLAY APPARATUS, AND RECODING MEDIUM

CROSS-REFERENCE OF RELATED APPLICATIONS

This application is the U.S. National Phase under 35 U.S.C. § 371 of International Patent Application No. PCT/JP2019/041158, filed on Oct. 18, 2019, which in turn claims the benefit of Japanese Application No. 2018-205441, filed on Oct. 31, 2018, the entire disclosures of which Applications are incorporated by reference herein.

TECHNICAL FIELD

The present disclosure relates to a video display apparatus, a method of controlling a video display apparatus, and a recording medium.

BACKGROUND ART

PTL 1 discloses a system including a tuner apparatus and a display apparatus which receives video data from the tuner apparatus via wireless communication. The display apparatus monitors the usage state of a buffer which accumulates the video data, and transmits the usage state to the tuner apparatus. Based on the received usage state of the buffer, the tuner apparatus estimates the residual time of the video data in the buffer. The tuner apparatus also estimates a wireless bandwidth for communicating the display apparatus, and based on the estimated residual time of the video data and wireless bandwidth, converts the content bit rate of the video data to transmit the video data to the display apparatus. Thus, the system disclosed in PTL 1 reduces the degradation of the image quality of the video based on the video data.

CITATION LIST

Patent Literature

PTL 1: Japanese Unexamined Patent Application Publication No. 2011-9904

SUMMARY OF THE INVENTION

Technical Problems

The present disclosure provides a video display system which can reduce the degradation of the image quality of a video based on a video stream received via wireless communication.

Solutions to Problems

The video display apparatus according to the present disclosure includes a wireless communicator which receives a video stream from a tuner apparatus via wireless communication; a display which displays a video based on the video stream; a high-definition multimedia interface (HDMI) (registered trademark) connector connected to a source apparatus via an HDMI (registered trademark) cable; and a changer which changes a signal output to the source apparatus from a hot plug detect (HPD) terminal to a level Hi when the changer receives a connection signal for communicating with the source apparatus via the HDMI (registered trademark) cable, the HPD terminal being included in the HDMI (registered trademark) connector, and changes the signal output from the HPD terminal to the source apparatus to a level Lo when the signal output from the HPD terminal to the source apparatus is at the level Hi and the video based on the video stream is displayed on the display.

Moreover, the method of controlling a video display apparatus according to the present disclosure includes receiving a video stream from a tuner apparatus via wireless communication; displaying a video based on the video stream; and changing a signal output to the source apparatus from a hot plug detect (HPD) terminal to a level when a connection signal for communicating with the source apparatus is received via the HDMI (registered trademark) cable, the HPD terminal being included in the HDMI (registered trademark) connector, and changing the signal output from the HPD terminal to the source apparatus to a level Lo when the signal output from the HPD terminal to the source apparatus is at the level Hi and the video based on the video stream is displayed.

Moreover, the recording medium according to the present disclosure is a computer-readable non-transient recording medium on which a program causing a computer to execute a method of controlling the video display apparatus according to the present disclosure is recorded.

Advantageous Effects of Invention

The video display apparatus according to the present disclosure, and the like can reduce the degradation of the image quality of the video based on the video stream received via wireless communication.

Figure 1:
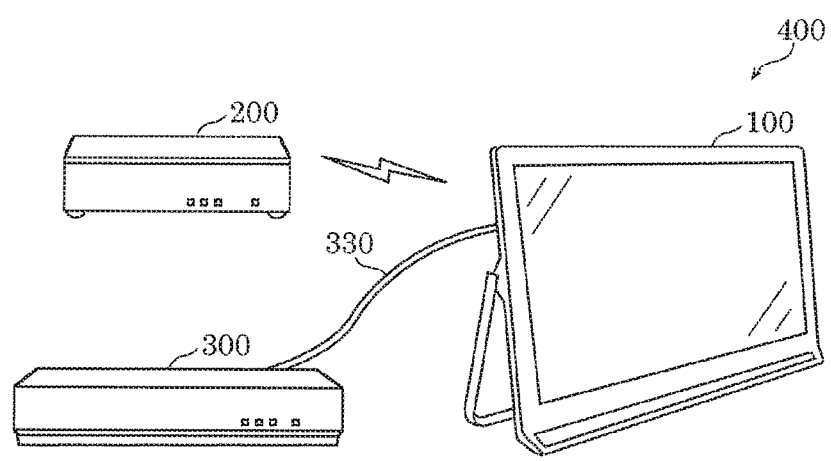
FIG. 1 is a schematic view illustrating a configuration of a system including the video display apparatus according to Embodiment 1.

DESCRIPTION OF EXEMPLARY EMBODIMENTS (Underlying Knowledge Forming Basis of the Present Disclosure)

First, the viewpoint of the present inventors will now be described.

Conventionally, there is a video display system including a tuner apparatus which receives a video stream (i.e., video data) transmitted by television broadcasting or the like, and a video display apparatus which displays the video based on the video stream received by the tuner apparatus, the tuner apparatus and the video display apparatus being arranged in separated housings. In such a video display system, the video stream received by the tuner apparatus may be transmitted to the video display apparatus via wireless communication rather than wired communication in some cases.

The video display apparatus included in the video display system may include a high-definition multimedia interface (HDMI) (registered trademark) input terminal (in other words, HDMI (registered trademark) connector) in some cases.

In the case where the video display apparatus includes the HDMI (registered trademark) connector, wireless communication between the tuner apparatus and the video display apparatus may receive interference from communication (HDMI (registered trademark) communication) via an HDMI (registered trademark) cable connected to the HDMI (registered trademark) connector in some cases.

Data transmission of video data and voice data via the HDMI (registered trademark) cable uses a transition minimized differential signaling (TMDS) signal, which is a high-speed differential signal. The harmonic components of the TMDS signal may overlap the communication bandwidth of wireless communication between the tuner apparatus and the video display apparatus (i.e., interfere with the communication bandwidth) depending on the transmission format according to the HDMI (registered trademark) standards (in other words, the communication bandwidth of communication using the TMDS signal) in some cases.

For example, in the case where a video stream is transmitted from the tuner apparatus to the video display apparatus with Wi-Fi (registered trademark) communication using a communication bandwidth of 5 Hz, 36 Ch (5.18 GHz) or 40 Ch (5.20 GHz) is used in the Wi-Fi (registered trademark) communication, and, for example, the TMDS signal conforms to the 1080i standards, the frequency of the harmonic (7th) in the communication bandwidth of the TMDS signal is 5.192 GHz. For this reason, in such a case, the harmonic component of the TMDS signal may interfere with the wireless communication between the tuner apparatus and the video display apparatus in some cases.

For example, in the case where a video stream is transmitted from the tuner apparatus to the video display apparatus with Wi-Fi (registered trademark) communication using a communication bandwidth of 5 GHz, the Wi-Fi (registered trademark) communication uses 11.2 Ch (5.56 GHz) or 116 Ch (5.58 GHz), and, for example, the TMDS signal conforms to the 1080p standards, the frequency of the harmonic (3rd) in the communication bandwidth of the TMDS signal is 5.563 GHz. For this reason, also in such a case, the harmonic component of the TMDS signal may interfere with the wireless communication between the tuner apparatus and the video display apparatus.

If the communication bandwidth of the HDMI (registered trademark) communication interferes with the communication bandwidth of wireless communication as in these cases, the transmission rate (or the bit rate) transmissible via wireless communication is reduced, which results in degraded image quality of the video based on the video stream displayed on the video display apparatus.

From such a viewpoint, it is considered that when the tuner apparatus and the video display apparatus perform wireless communication with each other, degradation of the image quality of the video displayed on the video display apparatus can be suppressed by stopping HDMI (registered trademark) communication in the video display apparatus.

Here, in the case where the source apparatus such as a Blu-ray (registered trademark) Disk (BD) player and the video display apparatus (that is, a synchronizing apparatus) are connected via an HDMI (registered trademark) cable, first, the source apparatus transmits a connection signal for communicating with the video display apparatus to the video display apparatus via the HDMI (registered trademark) cable. Specifically; to communicate with the video display apparatus, the source apparatus transmits the connection signal by changing the level of the signal output from the +5 V terminal (more specifically, 18-pin terminal) to a level Hi. In other words, the source apparatus outputs +5 V as the connection signal from the 18-pin terminal. Next, when the video display apparatus detects the level in the +5 V terminal included in the (registered trademark) connector, the video display apparatus changes the output of the hot plug detect (HPD) terminal (more specifically, 19-pin terminal) to the level Hi. More specifically, when the video display apparatus detects the signal of the level Hi in the +5 V terminal, the video display apparatus changes the potential output to the HPD terminal from a potential at a level Lo as a reference potential (for example, a ground potential of 0 V) to a potential of +5 V, i.e., at the level Hi. The source apparatus recognizes communicable connection of the HDMI (registered trademark) cable with the video display apparatus by detecting the signal of the level Hi in the HPD terminal. Furthermore, the source apparatus obtains extended display identification data (EDID) from the video display apparatus via a display data channel (DDC) line in the HDMI (registered trademark) cable to execute authentication of high-bandwidth digital content protection (HDCP). Thus, the video display apparatus and the source apparatus mutually execute authentication of HDMI (registered trademark). After executing such authentication, the source apparatus transmits the TMDS signal to the video display apparatus. The video display apparatus executes an operation based on the TMDS signal received from the source apparatus (such as display of the video and output of the voice).

Here, for example, assume that after authentication has been executed between the video display apparatus and the source apparatus, the video based on the video stream received from the tuner apparatus is displayed in the video display apparatus while the output of the HPD terminal is kept at the level Hi, that is, the communication of the TMDS signal between the video display apparatus and the source apparatus is kept enabled. In such a case, the source apparatus and the video display apparatus can communicate via the HDMI (registered trademark) cable without executing authentication again, for example, when the display of the video display apparatus is switched from the video based on the video stream to the video based on the TMDS signal. In contrast, for example, after authentication has been performed between the video display apparatus and the source apparatus, the output of the HPD terminal is changed to the level Lo, that is, the communication between the video display apparatus and the source apparatus is once disconnected, in such a case, the HDCP should be again authenticated when the video display apparatus and the source apparatus again communicate. For this reason, by keeping the communication of the TMDS signal enabled between the video display apparatus and the source apparatus, the video display apparatus can reduce the time to display the video based on the TMDS signal (video output time) by the time needed for authentication.

As described above, while the communication between the video display apparatus and the source apparatus is preferably disconnected from the viewpoint of the image quality of the video stream, the communication between the video display apparatus and the source apparatus is preferably kept from the viewpoint of the time until the video display apparatus executes the processing based on the TMDS signal.

In such consideration, the present inventors have completed the present disclosure.

Embodiments will now be described in detail with reference to the drawings appropriately. It should be note that detailed description beyond necessity will be omitted in some cases. For example, the duplications of the descriptions of already well-known facts and substantially identical configurations will be omitted in some cases. This is to avoid unnecessary redundancy of the following description and facilitate understanding by persons skilled in the art.

The present inventors will provide the accompanied drawings and the following description for fully understanding the present disclosure by persons skilled in the art, and do not intend to limit subject matters according to the scope of the claims.

Embodiment 1

Embodiment 1 will now be described with reference to FIGS. 1 to 5.
[1-1. Configuration]
<Outline>
FIG. 1 is a schematic view illustrating a configuration of video display system 400 including video display apparatus 100 according to Embodiment 1.

As illustrated in FIG. 1, video display system 400 includes video display apparatus 100, tuner apparatus 200 wirelessly communicable with video display apparatus 100, and source apparatus 300 communicable with video display apparatus 100 via. HDMI (registered trademark) cable 330.

Video display apparatus 100 is an apparatus which communicates with other apparatuses via wireless communication and wired communication, and displays a video based on a received signal. Video display apparatus 100 is a monitor apparatus or a television set which displays a video, for example. For example, video display apparatus 100 is communicably connected to tuner apparatus 200 via wireless communication, and is communicably connected to source apparatus 300 via wired communication, more specifically via HDMI (registered trademark) cable 330. It is sufficient that video display apparatus 100 is communicably connected to other apparatuses via wireless communication and wired communication, and the number of other apparatuses to be communicably connected is not particularly limited. FIG. 1 illustrates an example of the case where video display apparatus 100 is communicably connected to one source apparatus 300 via wired communication and is communicably connected to one tuner apparatus 200 via wireless communication.

For example, tuner apparatus 200 receives a broadcasted video stream, such as a program, from a base station (not illustrated) or the like, and then video display apparatus 100 receives the video stream from tuner apparatus 200 to display a video based on the received video stream.

Tuner apparatus 200 is a receiver connected to an antenna for receiving a broadcasted video stream, such as a program, from a base station (not illustrated) or the like by performing communication with the base station or the like (long distance wireless communication). Tuner apparatus 200 is a television receiver, for example. Tuner apparatus 200 transmits the received video stream to video display apparatus 100 via wireless communication (short distance wireless communication). Wireless communication between tuner apparatus 200 and video display apparatus 100 can be performed by any method. Wireless communication between tuner apparatus 200 and video display apparatus 100 is performed based on predetermined wireless communications standards such as Bluetooth (registered trademark), Wi-Fi (registered trademark), or ZigBee (registered trademark), for example. In the following description, tuner apparatus 200 and video display apparatus 100 perform wireless communication in accordance with the Wi-Fi (registered trademark) standards.

For example, video display apparatus 100 receives a TMDS signal, which is transmitted from source apparatus 300, based on the HDMI (registered trademark) standards via HMI (registered trademark) cable 330 to perform an operation based on the received TMDS signal. Specifically for example, video display apparatus 100 receives video data, which is one example of the TAMS signal transmitted from source apparatus 300, via HDMI (registered trademark) cable 330, and displays a video based on the received video data.

Source apparatus 300 is an apparatus communicably connected to video display apparatus 100 via HDMI (registered trademark) cable 330 to transmit the TMDS signal such as the video data to video display apparatus 100. Examples of source apparatus 300 include BD players, recorders, game apparatuses, and personal computers. In the following description, source apparatus 300 is a BD player which transmits video data as the TMDS signal to video display apparatus 100.

Figure 2:
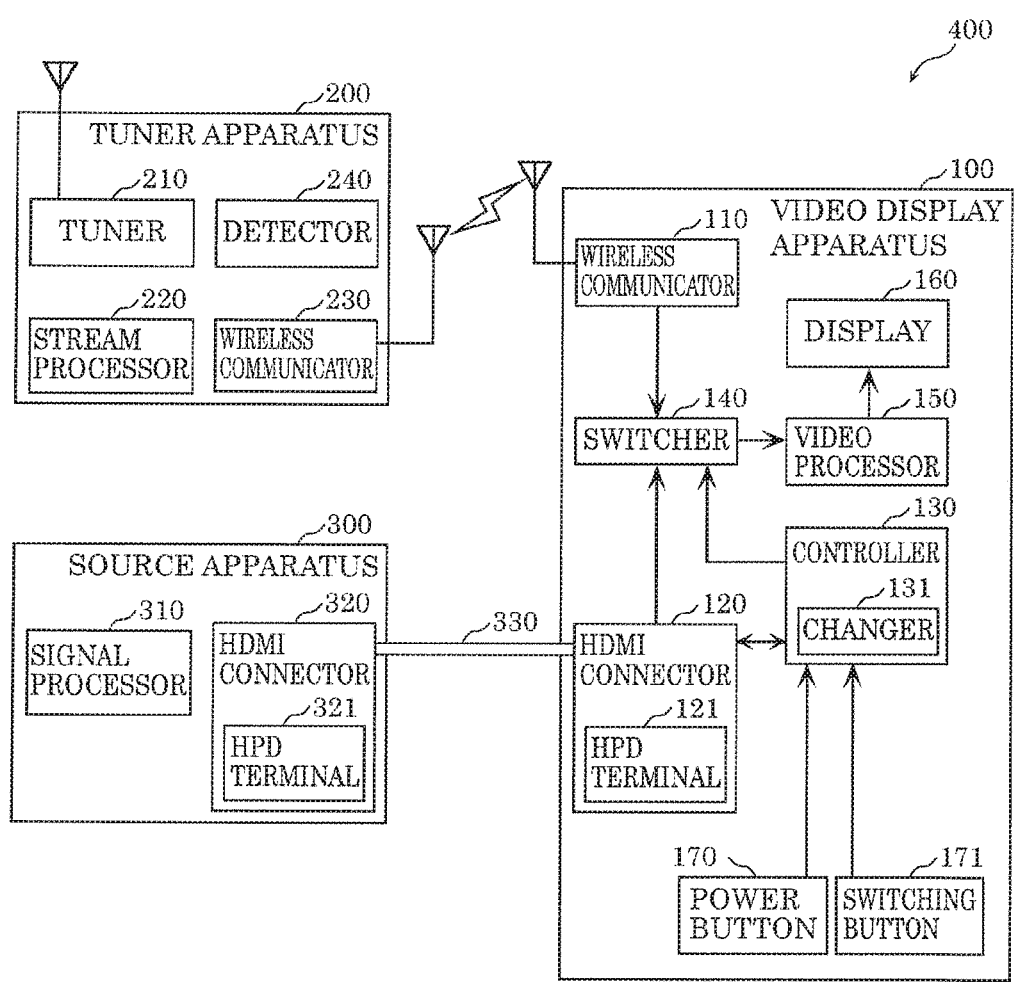
FIG. 2 is a block diagram illustrating a configuration of a system including the video display apparatus according to Embodiment 1.

FIG. 2 is a block diagram illustrating a configuration of video display system 400 including video display apparatus 100 according to Embodiment 1.
<Video Display Apparatus>
Video display apparatus 100 includes wireless communicator 110, HDMI (registered trademark) connector 120, controller 130, switcher 140, video processor 150, display 160, power button 170, and switching button 171.

Wireless communicator 110 is a wireless communication interface which wirelessly communicates with tuner apparatus 200. Wireless communicator 110 includes a wireless communication module, and receives a communication stream transmitted from tuner apparatus 200, for example.

HDMI (registered trademark) connector 120 is a communication interface for communicating with source apparatus 300 via HDMI (registered trademark) cable 330. Specifically HDMI (registered trademark) connector 120 is a connector connected to source apparatus 300 via HDMI (registered trademark) cable 330, and receives a signal, such as a TMDS signal, which is transmitted from source apparatus 300. HDMI (registered trademark) connector 120 includes a plurality of terminals (pins) including HPD terminal 121 according to the HDMI (registered trademark) standards.

Controller 130 is a processor which causes video display apparatus 100 to execute a variety of processings. For example, in the case where a user operates power button 170, controller 130 feeds electricity to display 160 from a power supply (not illustrated) (such as an external commercial power supply) electrically connected to video display apparatus 100, and causes display 160 to display a video based on the video stream or the TMDS signal. For example, in the case where the user operates switching button 171, controller 130 controls switches 140 to selectively switch the video displayed on display 160 between a video based on the video stream received from tuner apparatus 200 and the video based on the TMDS signal received from source apparatus 300.

Controller 130 is implemented with, for example, a central processing unit (CPO and a control program stored in a memory (not illustrated), such as a read only memory (ROM), a random access memory (RAM), a hard disk drive (HDD), or a solid state drive (SSD), included in video display apparatus 100.

Controller 130 functionally includes changer 131.

When receiving a connection signal for communicating with source apparatus 300 via HDMI (registered trademark) cable 330, changer 131 changes a signal to level Hi, the signal being output to source apparatus 300 from HPD terminal 121 included in HDMI (registered trademark) connector 120. When the signal output from HPD terminal 121 is at level Hi and the video based on the video stream is displayed on display 160, changer 131 changes the signal output from HPD terminal 121 to source apparatus 300 to level Lo. For example, the signal of level Lo is at a ground potential (more specifically, 0 V) while the signal of level Hi is at +5 V By changing the signal output from HPD terminal 121 to source apparatus 300 to level Lo, source apparatus 300 determines that source apparatus 300 is not communicably connected to video display apparatus 100. For this reason, by changing the signal output from HPD terminal 121 to source apparatus 300 to level Lo, source apparatus 300 stops transmission of the TMDS signal to video display apparatus 100. In other words, by changing the signal output from D terminal 121 to source apparatus 300 to level Lo, changer 131 can stop transmission of the TMDS signal by source apparatus 300.

Switcher 140 is a switch which selectively switches the video displayed on display 160 between the video based on the video stream received from tuner apparatus 200 and the video based on the TMDS signal received from source apparatus 300. It is sufficient that switcher 140 can selectively switch the video displayed on display 160 between the video based on the video stream and the video based on the TMDS signal, and switcher 140 may be implemented with a circuit or the like as hardware, or may be implemented as software.

Video processor 150 is a processor which causes display 160 to display the video stream and the video based on the TMDS signal by processing the video stream received from tuner apparatus 200 and the TMDS signal received from source apparatus 300. The video stream and the TMDS signal are encoded based on predetermined standards. For this reason, video processor 150 decodes the encoded video stream and TMDS signal, and causes display 160 to display the video based on the decoded information.

Video processor 150 is implemented with, for example, a CPU and a control program stored in a memory (not illustrated), such as a ROM, a RAM, an HDD, or an SSD, included in video display apparatus 100.

Controller 130 and video processor 150 may be implemented with one CPU and one memory or may be implemented with different CPUs and memories, respectively.

Display 160 is a display which displays the videos based on the video stream and the TMDS signal. It is sufficient that display 160 can display the video. Display 160 may be arbitrarily selected from liquid crystal displays, organic electruluminescent (EL) displays, and the like.

Power button 170 is a button operated by a user such that controller 130 switches the power supply of video display apparatus 100 among on, off, and standby states. For example, in the case where controller 130 receives a signal indicating that power button 170 is operated from power button 170 in the state where the power supply of video display apparatus 100 is on, controller 130 stops feed of electricity to display 160, and changes the state of electricity fed to the apparatuses included in video display apparatus 100 to a standby state where electricity is fed to only part of the apparatuses included in video display apparatus 100.

Switching button 171 is a button operated by the user such that controller 130 causes switcher 140 to selectively switch the video displayed on display 160 between the video based on the video stream received from tuner apparatus 200 and the video based on the TMDS signal received from source apparatus 300.

Power button 170 and switching button 171 may be implemented with a button operable by the user by pressing down it, or may be implemented with a sensor for receiving an operation signal indicating an operation from a console operated by the user, for example, on/off of the power supply, processing to change to the standby state described above, or switching of the video displayed on display 160. Moreover, for example, video display apparatus 100 may further include a smart speaker including a microphone which detects the voice of the user to obtain the operation signal from the smart speaker.

<Tuner Apparatus>

Tuner apparatus 200 includes tuner 210, stream processor 220, and wireless communicator 230.

Tuner 210 is a tuner connected to an antenna for receiving the video stream from the outside.

Stream processor 220 is a processor which converts the video stream received by tuner 210 to a predetermined bit rate.

In the case where the bit rate in the communication bandwidth is short when tuner apparatus 200 and video display apparatus 100 perform wireless communication, the video displayed on video display apparatus 100 may be frozen in some cases. To prevent the freeze of the video in video display apparatus 100, at a low bit rate in the communication bandwidth of wireless communication, stream processor 220 decodes the video stream received by tuner apparatus 200, re-encodes the video stream at a bit rate corresponding to the communication bandwidth, and transmits the video stream.

Wireless communicator 230 is a wireless communication interface which transmits the video stream having a bit rate converted by stream processor 220 to video display apparatus 100 via wireless communication.

Tuner apparatus 200 may further include detector 240.

Detector 240 is a detector which detects the wireless communication bandwidth of the signal wirelessly communicated between tuner apparatus 200 and video display apparatus 100. In the case where tuner apparatus 200 includes detector 240, rather than the predetermined bit rate, stream processor 220 may determine a bit rate for converting the video stream from the wireless communication bandwidth between tuner apparatus 200 and video display apparatus 100 detected by detector 240, and may convert the bit rate of the video stream to the determined bit rate.

<Source Apparatus>

Source apparatus 300 includes signal processor 310 and HDMI (registered trademark) connector 320.

Signal processor 310 is a processor which processes the TMDS signal transmitted to video display apparatus 100. For example, signal processor 310 reads video data with a sensor (not illustrated) from a storage (not illustrated), such as a BD disc, on which the video data is recorded, and encodes the video data based on the HDMI (registered trademark) standards to generate the TMDS signal.

HDMI (registered trademark) connector 320 is connected to HDMI (registered trademark) cable 330, and is a communication interface for transmitting the TMDS signal generated by signal processor 310 to video display apparatus 100 via (registered trademark) cable 330. HDMI (registered trademark) connector 320 includes a plurality of terminals including HPD terminal 321 according to the HDMI (registered trademark) standards.

[1-2. Operation]

The operation of video display apparatus 100 having the configuration described above will now be described.

Figure 3:
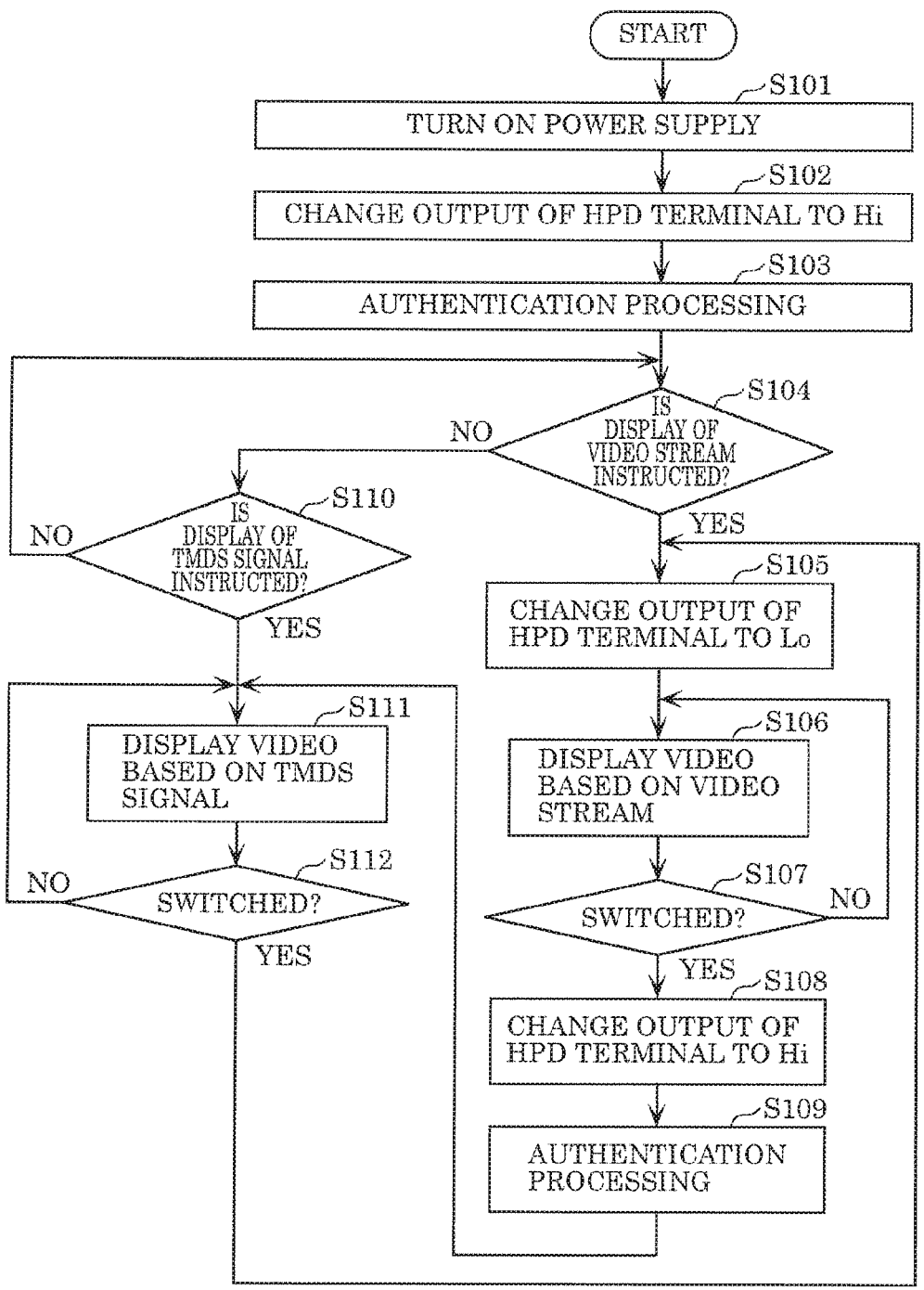
FIG. 3 is a flowchart illustrating one specific example of the operational procedure of the video display apparatus according to Embodiment 1 to control a signal output from the HPD terminal.

FIG. 3 is a flowchart illustrating one specific example of the operational procedure of video display apparatus 100 according to Embodiment 1 to control the voltage output from HPD terminal 121.

First, assume that controller 130 obtains a signal to turn on the power supply from power button 170, and turns on the power supply of video display apparatus 100 (step S101). Assume that, before step S101, video display apparatus 100 is preliminarily communicably connected to tuner apparatus 200 via wireless communication, and is connected to source apparatus 300 via HDMI (registered trademark) cable 330.

Next, when controller 130 receives a connection signal via HDMI (registered trademark) cable 330 for the first time after the power supply of video display apparatus 100 is turned on, controller 130 changes the level of a signal, which is output from HPD terminal 121 included in HDMI (registered trademark) connector 120, to level Hi (step S102).

Video display apparatus 100 and source apparatus 300 communicate with each other via HDMI (registered trademark) cable 330 to execute authentication processing (step S103).

Figures 4, 5:
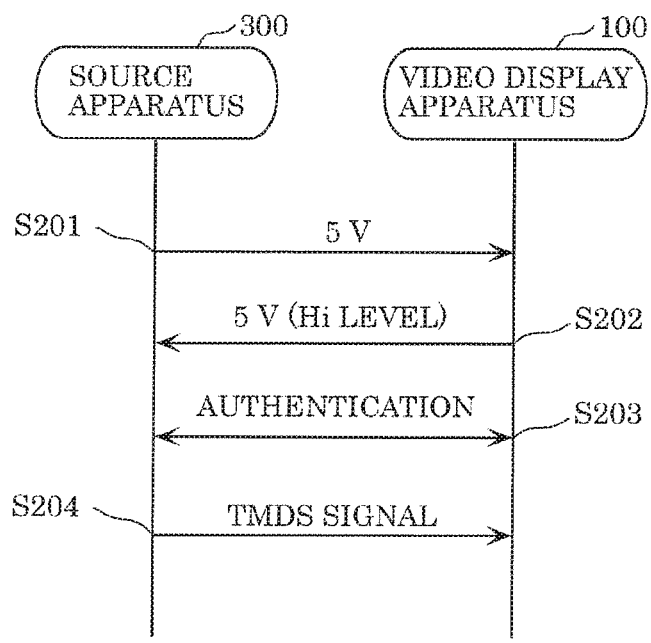
FIG. 4 is a sequence diagram illustrating one specific example of authentication processing executed by the video display apparatus together with the source apparatus in Embodiment 1.
FIG. 5 is a table showing one specific example of the level of the signal output from the HPD terminal for the processing executed by the video display apparatus according to Embodiment 1.

FIG. 4 is a sequence diagram illustrating one specific example of the authentication processing executed by video display apparatus 100 together with source apparatus 300 in Embodiment 1. Specifically, FIG. 4 is a sequence diagram illustrating one specific example of steps S102 and S103 in FIG. 3.

First, source apparatus 300 transmits a +5 V signal as a connection signal to video display apparatus 100 by changing the level of the signal, which is output to a +5 V terminal (more specifically 18-pin terminal) included in HDMI (registered trademark) connector 320, to level Hi (step S201).

In the next step, when video display apparatus 100 detects the +5 V signal transmitted from source apparatus 300 with a +5 V terminal included in (registered trademark) connector 120, video display apparatus 100 transmits a +5 V signal to source apparatus 300 by changing the level of the signal output from HPD terminal 121 (more specifically 19-pin terminal) to level Hi (step S202). More specifically, when video display apparatus 100 detects the signal of level Hi in the +5 V terminal, video display apparatus 100 changes the voltage output from HPD terminal 121 from level Lo to Hi.

Next, when source apparatus 300 detects the signal of level Hi in HPD terminal 321, source apparatus 300 recognizes connection of HDMI (registered trademark) cable 330 to source apparatus 300.

Next, source apparatus 300 obtains extended display identification data (EDID) from video display apparatus 100 via a DDC line in HDMI (registered trademark) cable 330 to execute authentication of the HDCP (step S203). By providing such a configuration, video display apparatus 100 and source apparatus 300 mutually execute authentication of the HDMI (registered trademark).

Thereby; in the next step, transmission of the TMDS signal to video display apparatus 100 by source apparatus 300, for example (step S204), enables video display apparatus 100 to execute an operation based on the TMDS signal received from source apparatus 300 (such as display of the video and output of the voice).

In the case where the processing in step S101 is a change from the standby state, the authentication processing has already been performed by video display apparatus 100 and source apparatus 300 before the change to the standby state, and the signal of level Hi is output in the standby state from HPD terminal 121 included in HDMI (registered trademark) connector 120, the processings in steps S102 and S103 are already completed when step S101 is executed. For this reason, steps S102 and S103 do not need to be executed.

Again with reference to FIG. 3, subsequent to step S103, controller 130 determines whether it has obtained an instruction to display the video based on the video stream on display 160 from switching button 171 (step S104).

When controller 130 determines that it has obtained the instruction to display the video based on the video stream on display 160 from switching button 171 (Yes in step S104), changer 131 changes the signal output from HPD terminal 121 from level Hi to Lo (step S105).

In the next step, controller 130 causes the video based on the video stream to be displayed on display 160 (step S106).

In the next step, controller 130 determines whether it has obtained an instruction to change the video displayed on display 160 from the video based on the video stream to the video based on the TMDS signal from switching button 171 (step S107).

When controller 130 does not obtain the instruction to change the video displayed on display 160 from the video based on the video stream to the video based on the TMDS signal from the switching button 171 (No in step S107), it returns the processing to step S106 to continue the display of the video based on the video stream on display 160.

In contrast, when controller 130 has obtained the instruction to change the video displayed on display 160 from the video based on the video stream to the video based on the TMDS signal from switching button 171 (Yes in step S107), changer 131 changes the signal output to HPD terminal 121 included in HDMI (registered trademark) connector 120 to level Hi (step S108), and similarly to step S103, video display apparatus 100 and source apparatus 300 communicate with each other via HDMI (registered trademark) cable 330 to execute the authentication processing (step S109).

When controller 130 does not determine that it has obtained the instruction to display the video based on the video stream on display 160 from switching button 171 (No in step S104), controller 130 determines whether it has obtained an instruction to display the video based on the TMDS signal on display 160 from switching button 171 (step S110).

When controller 130 does not obtain the instruction to display the video based on the TMDS signal on display 160 from switching button 171 (No in step S110), for example, it returns the processing to step S104.

In contrast, when controller 130 determines that it has obtained the instruction to display the video based on the TMDS signal on display 160 from switching button 171 (Yes in step S110) or subsequent to step S109, controller 130 causes the video based on the TMDS signal to be displayed on display 160 (step S111).

In the next step, controller 130 determines whether from switching button 171, controller 130 has obtained an instruction to change the video displayed on display 160 from the video based on the TMDS signal to the video based on the video stream (step S112).

When controller 130 does not obtain the instruction to change the video displayed on display 160 from the video based on the TMDS signal to the video based on the video stream from switching button 171 (No in step S112), it returns the processing to step S111 to continue the display of the video based on the TMDS signal on display 160.

In contrast, when controller 130 has obtained the instruction to change the video displayed on display 160 from the video based on the TMDS signal to the video based on the video stream from switching button 171 (Yes in step S112), it moves the processing to step S105.

FIG. 5 is a table showing one specific example of the level of the signal output to HPD terminal 121 for the processing executed by video display apparatus 100 according to Embodiment 1.

For example, changer 131 outputs the signal of level Lo from HPD terminal 121 when the power supply of video display apparatus 100 is on and the input of switcher 140 is the video stream input, that is, when the video based on the video stream is displayed on display 160.

Moreover, for example, changer 131 outputs the signal of level Hi from HPD terminal 121 when the power supply of video display apparatus 100 is on and the input of switcher 140 is the TMDS signal input, that is, the video based on the TMDS signal is displayed on display 160.

Moreover, for example, changer 131 outputs the signal of level Hi from HIT terminal 121 when the power supply of video display apparatus 100 is in the standby state, that is, the video is not displayed on display 160.

[1-3. Effects]

As described above, in Embodiment 1, video display apparatus 100 includes wireless communicator 110 which receives a video stream from tuner apparatus 200 via wireless communication, display 160 which displays a video based on the video stream, HDMI (registered trademark) connector 120 connected to source apparatus 300 via HDMI (registered trademark) cable 330, and changer 131 which changes a signal, which is output to source apparatus 300 from HPD terminal 121 included in HDMI (registered trademark) connector 120, to level Hi when it receives a connection signal for communicating with source apparatus 300 via HDMI (registered trademark) cable 330, and changes the signal output from HPD terminal 121 to source apparatus 300 to level Lo when the signal output from HPD terminal 121 to source apparatus 300 is at level Hi and the video based on the video stream is displayed on display 160.

In such a configuration, when display 160 displays the video based on the video stream, changer 131 brings about a state where it cannot receive the TMDS signal, in other words, brings about a pseudo non-connection state between source apparatus 300 and video display apparatus 100. Thereby, the wireless communication where the video stream is being received can be exempted from the interference from noises derived from HDMI (registered trademark) communication. For this reason, the degradation of the video based on the video stream can be reduced.

Embodiment 2

Embodiment 2 will now be described with reference to FIGS. 6 to 8. Identical referential numerals will be given to substantially identical configurations to those in Embodiment 1, and the duplications of descriptions will be omitted or simplified in some cases.

[2-1. Configuration]

Figure 6:
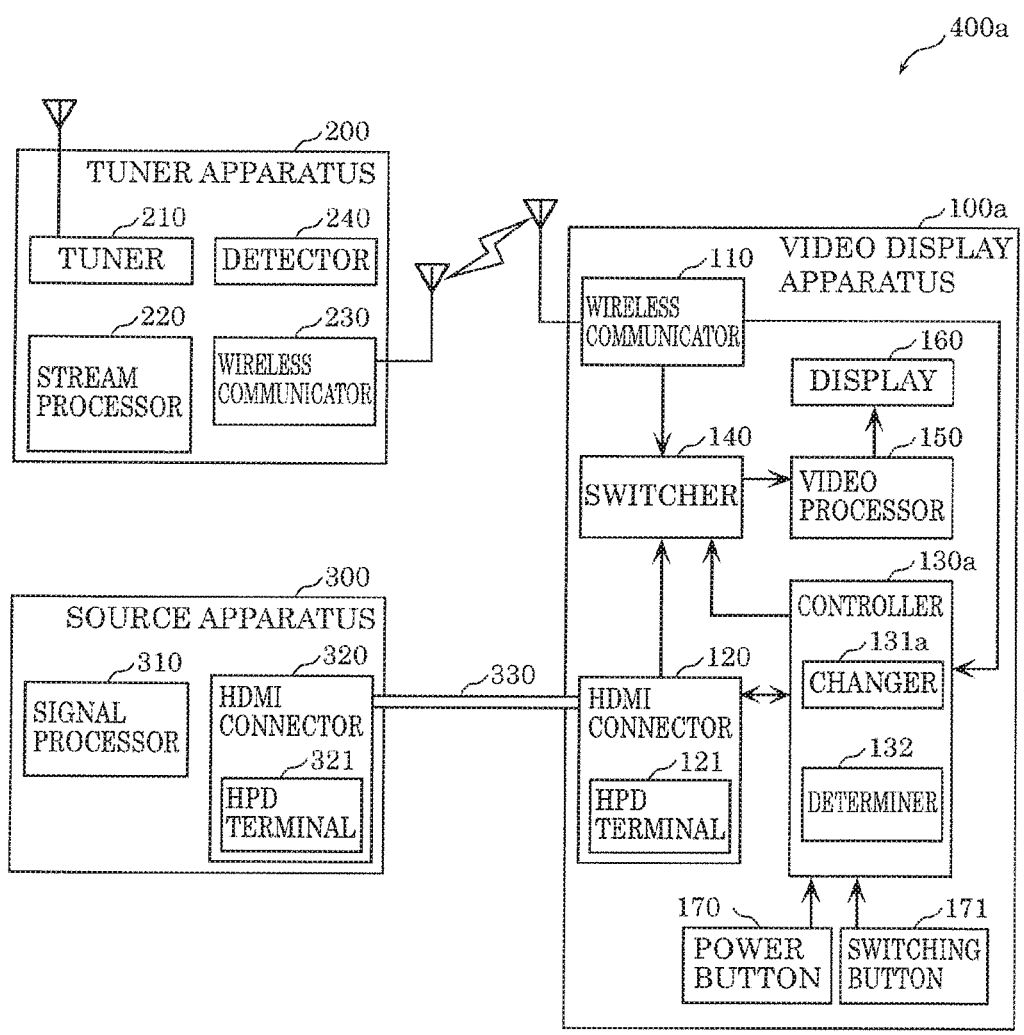
FIG. 6 is a block diagram illustrating a configuration of a system including the video display apparatus according to Embodiment 2.

FIG. 6 is a block diagram illustrating a configuration of video display system 400a including video display apparatus 100a according to Embodiment 2.

Video display system 400a includes video display apparatus 100a, tuner apparatus 200, and source apparatus 300.

Video display apparatus 100a includes wireless communicator 110, HDMI (registered trademark) connector 120, controller 130a, switcher 140, video processor 150, display 160, power button 170, and switching button 171.

Controller 130a is a processor which causes video display apparatus 100a to execute a variety of processings. For example, in the case where a user operates power button 170, controller 130a feeds electricity to display 160 from a power supply (not illustrated) (such as an external commercial power supply) electrically connected to video display apparatus 100, and causes display 160 to display a video based on the video stream or the TMDS signal. For example, in the case where the user operates switching button 171, controller 130a controls switcher 140 to selectively switch the video displayed on display 160 between a video based on the video stream received from tuner apparatus 200 and the video based on the TMDS signal received from source apparatus 300.

Controller 130a is implemented with, for example, a CPU and a control program stored in a memory (not illustrated), such as a ROM, a RAM, an HDD, or an SSD, included in video display apparatus 100a.

Controller 130a functionally includes changer 131a and determiner 132.

Determiner 132 determines whether at least part of the communication bandwidth of communication with source apparatus 300 via HDMI (registered trademark) cable 330 overlaps the communication bandwidth of a video stream received from tuner apparatus 200. Specifically determiner 132 determines whether at least part of the communication bandwidth of the TMDS signal received from source apparatus 300 (more specifically communication bandwidth containing harmonic components) overlaps the communication bandwidth of the video stream received from tuner apparatus 200.

Determiner 132 obtains the communication bandwidth of a TMDS signal from a received TMDS signal, for example. Because the communication bandwidth used for the TMDS signal is determined according to the HDMI (registered trademark) standards, video display apparatus 100a may preliminarily store the communication bandwidth of the TMDS signal in a storage (not illustrated) such as a memory. Determiner 132 obtains the communication bandwidth of a communication stream from a received communication stream. Video display apparatus 100a may preliminarily store the communication bandwidth of the communication stream in a storage (not illustrated) such as a memory.

When changer 131a receives a connection signal for communicating with source apparatus 300 via HDMI (registered trademark) cable 330, changer 131a changes a signal, which is output to source apparatus 300 from HPD terminal 121 included in HDMI (registered trademark) connector 120, to level Hi. When the signal output from HPD terminal 121 is at level and determiner 132 determines that at least part of the communication bandwidth of communication with source apparatus 300 via HDMI (registered trademark) cable 330 overlaps the communication bandwidth of the video stream, changer 131a changes the signal output to HPD terminal 121 to level Lo. Specifically when the signal output from HPD terminal 121 is at level Hi, the video based on the video stream is displayed on display 160, and determiner 132 determines that at least part of the communication bandwidth of the TMDS signal overlaps the communication bandwidth of the video stream, changer 131a changes the signal output from HPD terminal 121 to level Lo.

To be noted, changer 131a and determiner 132 may be implemented with one CPU and one memory or may be implemented with different CPUs and memories, respectively

[2-2. Operation]

The operation of video display apparatus 100a having such a configuration above will now be described. Identical referential numbers will be given to steps identical to those in Embodiment 1, and their descriptions be omitted in some cases.

Figures 7, 8:
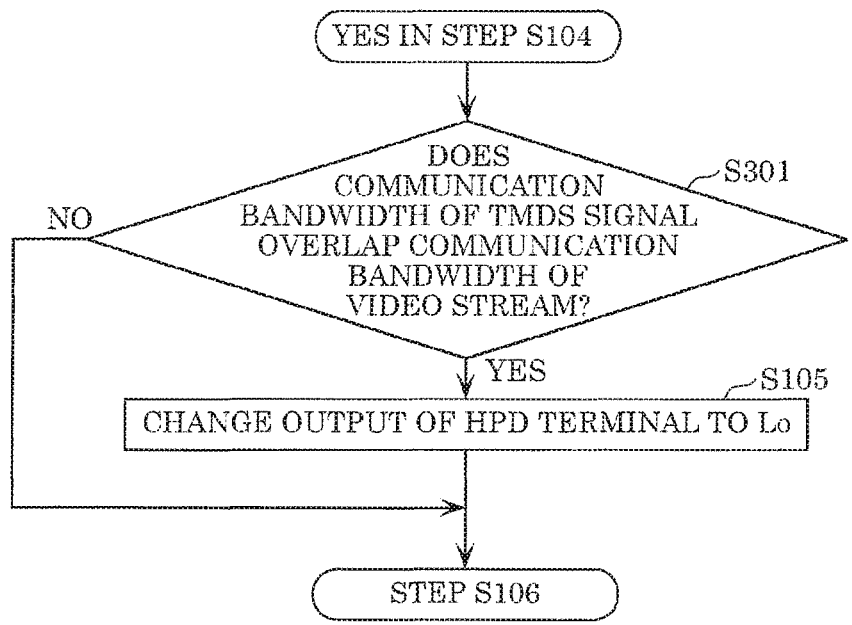
FIG. 7 is a flowchart illustrating one specific example of the operational procedure of the video display apparatus according to Embodiment 2 to control a signal output from the HPD terminal.
FIG. 8 is a table showing one specific example of the level of the signal output from the HPD terminal for the processing executed by the video display apparatus according to Embodiment 2.

FIG. 7 is a flowchart illustrating one specific example of an operational procedure of video display apparatus 100a according to Embodiment 2 to control a signal output from HPD terminal 121. FIG. 7 illustrates operations of video display apparatus 100a according to Embodiment 2, which are differences from the flowchart in FIG. 3 illustrating one specific example of the operation of video display apparatus 100 according to Embodiment 1. In other words, video display apparatus 100a according to Embodiment 2 executes the operation in the flowchart illustrated in FIG. 7 and the operation in the flowchart illustrated in FIG. 3.

First, assume that video display apparatus 100a has executed the operations from steps S101 to S104 illustrated in FIG. 3.

In the next step, when controller 130a determines that it receives an instruction to display the video based on the video stream on display 160 from switching button 171 (Yes in step S104), determiner 132 determines whether at least part of the communication bandwidth of the TMDS signal received from source apparatus 300 overlaps the communication bandwidth of the video stream received from tuner apparatus 200 (step S301).

When determiner 132 determines that at least part of the communication bandwidth of the TMDS signal received from source apparatus 300 overlaps the communication bandwidth of the video stream received by tuner apparatus 200 (Yes in step S301), similarly to step S105 illustrated in FIG. 3, changer 131a changes the signal output from HPD terminal 121 from level Hi to Lo to move the processing to step S106 illustrated in FIG. 3.

In contrast, when determiner 132 determines that the communication bandwidth of the TMDS signal received from source apparatus 300 does not overlap the communication bandwidth of the video stream received by tuner apparatus 200 (No in step S301), without changing the signal output from HPD terminal 121 from level Hi to Lo, changer 131a moves the processing to step S106 illustrated in FIG. 3 while the signal of level Hi is output to HPD terminal 121.

FIG. 8 is a table showing one specific example of the level of the signal output from HPD terminal 121 for the processing executed by video display apparatus 100a according to Embodiment 2.

For example, changer 131a outputs the signal of level Hi from HPD terminal 121 when the power supply of video display apparatus 100a is on, the input of switcher 140 is a video stream input, that is, the video based on the video stream is displayed on display 160, and the communication bandwidth of wireless communication and the HDMI (registered trademark) communication bandwidth, more specifically, harmonic components in the communication bandwidth of wireless communication and those in the HDMI (registered trademark) communication bandwidth do not overlap.

Moreover, for example, changer 131a outputs the signal of level Lo from HPD terminal 121 when the power supply of video display apparatus 100a is on, the input of switcher 140 is the video stream input, and at least part of the communication bandwidth of wireless communication and the (registered trademark) communication bandwidth, more specifically harmonic components in the communication bandwidth of wireless communication and those in the (registered trademark) communication bandwidth at least partially overlap.

For example, changer 131a outputs the signal of level Lo from HPD terminal 121 when the power supply of video display apparatus 100a is on and the input of switcher 140 is the video stream input but the input of the TAMS signal is not acceptable.

Thus, for example, when the power supply of video display apparatus 100a is on, the input of switcher 140 is the video stream input, and the communication bandwidth of wireless communication and the HDMI (registered trademark) communication bandwidth do not interfere with each other, changer 131a outputs the signal of level Lo from HPD terminal 121.

Moreover, for example, when the power supply of video display apparatus 100a is on, the input of switcher 140 is the TMDS signal input, that is, the video based on the TMDS signal is displayed on display 160, changer 131a outputs the signal of level Hi from HPD terminal 121.

Moreover, for example, when the power supply of video display apparatus 100a is in the standby state, that is, the video is not displayed on display 160, changer 131a outputs the signal of level Hi from HPD terminal 121.

To be noted, for example, when the power supply of video display apparatus 100a is in the standby state, changer 131a may output the signal of level Hi from HPD terminal 121 or may output the signal of level Lo therefrom. For example, video display apparatus 100a may further include a reception button such as a button for receiving an operation by a user, and based on the user's instruction received from the reception button, changer 131a may change the level of the signal output from HPD terminal 121.

[2-3. Effects]

Thus, in Embodiment 2, video display apparatus 100a further includes determiner 132 in addition to the configuration of video display apparatus 100. Determiner 132 determines whether at least part of the communication bandwidth in communication with source apparatus 300 via HDMI (registered trademark) cable 330 overlaps the communication bandwidth of the video stream received from tuner apparatus 200. In this case, when the signal output from HPD terminal 121 to source apparatus 300 is at level Hi and determiner 132 determines that at least part of the communication bandwidth in communication with source apparatus 300 via HDMI (registered trademark) cable 330 overlaps the communication bandwidth of the video stream, changer 131a changes the signal output from HPD terminal 121 to source apparatus 300 to level Lo.

In such a configuration, similarly to changer 131 in Embodiment 1, changer 131a can prevent the wireless communication where the video stream is being received from receiving interference from noises derived from the HDMI (registered trademark) communication. For this reason, the degradation of the video based on the video stream can be reduced. Moreover, based on the result of determination by determiner 132 whether wireless communication receives interference from HDMI (registered trademark) communication, changer 131a changes the level of the signal output from HPD terminal 121. For example, when determiner 132 determines that there is no interference, changer 131a keeps the level of the signal output from HPD terminal 121 at level Hi. For this reason, in such configurations, the degradation of the image quality of the video stream can be reduced, and the number of authentication processings between source apparatus 300 and video display apparatus 100a can be further reduced when the level of the signal output from HPD terminal 121 is at level Hi.

Other Embodiments

As above, Embodiments 1 and 2 have been described as examples of the technique disclosed in this application. However, the technique in the present disclosure is not limited to these, and can also be applied to embodiments appropriately modified, replaced, added, and omitted. The components of the embodiments described above can be combined into new embodiments.

Other embodiments will now be exemplified.

For example, in the embodiments, all or part of the components included in the video display apparatus according to the present disclosure, such as controllers 130 and 130a and video processor 150, may be configured with dedicated hardware, or may be implemented by executing software programs suitable for the respective components. The components may be implemented by a program executer such as a central processing unit (CPU) or a processor, which reads a software program recorded on a recording medium such as a hard disk drive (HDD) or a semiconductor memory.

Moreover, the components in the processor such as controllers 130 and 130a included in the video display apparatus according to the present disclosure may be configured with one or more electronic circuits. The one or more electronic circuits each may be a general-purpose circuit, or may be a dedicated circuit.

The one or more electronic circuits may include a semiconductor device, an integrated circuit (IC), or a large scale integration (LSI), for example. The IC or the LSI may be integrated in a single chip, or may be integrated in a plurality of chips. Although the circuit is referred to as IC or LSI here, it is referred to as another name according to the degree of integration, and may be called a system LSI, a very large scale integration (VLSI), or an ultra large scale integration (ULSI). Moreover, a field programmable gate array (FPGA) programmed after manufacturing of the LSI can also be used for the same purpose.

The general or specific aspects of the present disclosure may be implemented with a system, a device, a method, an integrated circuit, or a computer program. Alternatively, these aspects may be implemented with a computer-readable non-transitory recording medium such as an optical disc, an HDD, or a semiconductor memory on which the computer program is stored.

For example, the present disclosure is a method of controlling a video display apparatus connected to a source apparatus via a high-definition multimedia interface (HDMI) (registered trademark) cable, and may be implemented with a method of controlling video display apparatus 100 or 100a, the method including receiving a video stream from tuner apparatus 200 via wireless communication; displaying a video based on the video stream; and changing a signal, which is output to source apparatus 300 from HPD terminal 121 included in HDMI (registered trademark) connector 120, to level Hi when a connection signal for communicating with source apparatus 300 via HDMI (registered trademark) cable 330, and changing the signal output from HPD terminal 121 to source apparatus 300 to level Lo when the signal output from HPD terminal 121 is at level Hi and the video based on the video stream is displayed.

Moreover, for example, the present disclosure may be implemented as a computer-readable non-transient recording medium on which a program causing a computer to execute the method of controlling video display apparatuses 100 and 100a according to Embodiments 1 and 2 is recorded. This program may be recorded on a recording medium such as a computer-readable CD-ROM, or may be distributed through a communication path such as the Internet.

For example, video display apparatuses 100 and 100a according to the present disclosure may include sound generators such as an amplifier and a loudspeaker. The TMDS signal may also contain data other than the video data. The TMDS signal may contain not only the video data but also the sound data, for example. When the TMDS signal contains the data other than the video data, for example, the sound data, controllers 130 and 130a may execute processing based the data, such as processing to output a sound based on the sound data. The signal used in communication with HDMI (registered trademark) cable 330 does not need to be a TMDS signal.

Thus, the embodiments have been described as examples of the technique according to the present disclosure. For this purpose, the attached drawings and the detailed description have been provided.

Accordingly to exemplify the technique above, the components described in the attached drawings and the detailed description can include not only components essential for solving the above problems but also those not essential for solving the problems. For this reason, it should not be certified that such non-essential components are essential just because these non-essential components are described in the attached drawings and the detailed description.

Moreover, the embodiments described above are intended to exemplify the technique according to the present disclosure, and therefore can be subjected to a variety of modifications, substitutions, additions, and omissions within the scope of claims or its equivalent range.

INDUSTRIAL APPLICABILITY

The present disclosure can be used in video display apparatuses, such as television sets, which enable wireless communication with tuner apparatuses and communication with source apparatuses via HDMI (registered trademark) cables.

The invention claimed is:
1. A video display apparatus comprising:
a wireless communicator which receives a video stream from a tuner apparatus via wireless communication;
a display which displays a video based on the video stream;
a high-definition multimedia interface (HDMI) (registered trademark) connector connected to a source apparatus via an HDMI (registered trademark) cable; and
a changer which changes a signal output to the source apparatus from a hot plug detect (HPD) terminal to a level Hi when the changer receives a connection signal for communicating with the source apparatus via the

HDMI (registered trademark) cable, the HPD terminal being included in the HDMI (registered trademark) connector, and changes the signal output from the HPD terminal to the source apparatus to a level Lo when the signal output from the HPD terminal to the source apparatus is at the level Hi and the video based on the video stream is displayed on the display, and when the video display apparatus is in a standby state, the changer changes the level of the signal output from the HPD terminal to the level Hi, where in the standby state, power is supplied to video display apparatus and video is not displayed on the display; and a determiner which determines whether at least part of a communication bandwidth containing harmonic components of communication with the source apparatus via the HDMI (registered trademark) cable overlaps a communication bandwidth of the video stream received from the tuner apparatus, wherein the changer changes the signal output from the HPD terminal to the source apparatus to the level Lo when the signal output from the HPD terminal to the source apparatus is at the level Hi and the determiner determines that the at least part of the communication bandwidth containing harmonic components of communication with the source apparatus via the HDMI (registered trademark) cable overlaps the communication bandwidth of the video stream.

2. The video display apparatus according to claim 1, further comprising:

a determiner which determines whether at least part of a communication bandwidth of communication with the source apparatus via the HDMI (registered trademark) cable overlaps a communication bandwidth of the video stream received from the tuner apparatus, wherein the changer changes the signal output from the HPD terminal to the source apparatus to the level Lo when the signal output from the HPD terminal to the source apparatus is at the level Hi and the determiner determines that the at least part of the communication bandwidth of the communication with the source apparatus via the HDMI (registered trademark) cable overlaps the communication bandwidth of the video stream.

3. A method of controlling a video display apparatus connected to a source apparatus via a high-definition multimedia interface (HDMI) (registered trademark) cable, the method comprising:

receiving a video stream from a tuner apparatus via wireless communication;

displaying a video based on the video stream; and changing a signal output to the source apparatus from a hot plug detect (HPD) terminal to a level Hi when a connection signal for communicating with the source apparatus is received via the HDMI (registered trademark) cable, the HPD terminal being included in the HDMI (registered trademark) connector, and changing the signal output from the HPD terminal to the source apparatus to a level Lo when the signal output from the HPD terminal to the source apparatus is at the level Hi and the video based on the video stream is displayed, and when the video display apparatus is in a standby state, changing the level of the signal output from the HPD terminal to the level Hi, where in the standby state, power is supplied to video display apparatus and video is not displayed on the display; and determining whether at least part of a communication bandwidth containing harmonic components of communication with the source apparatus via the HDMI (registered trademark) cable overlaps a communication bandwidth of the video stream received from the tuner apparatus, changing the signal output from the HPD terminal to the source apparatus to the level Lo when the signal output from the HPD terminal to the source apparatus is at the level Hi and determining that the at least part of the communication bandwidth containing harmonic components of communication with the source apparatus via the HDMI (registered trademark) cable overlaps the communication bandwidth of the video stream.

4. A computer-readable non-transient recording medium on which a program causing a computer to execute the method of controlling a video display apparatus according to claim 3 is recorded.

5. A video display apparatus comprising:

a wireless communicator which receives a video stream from a tuner apparatus via wireless communication;

a display which displays a video based on the video stream;

a high-definition multimedia interface (HDMI) (registered trademark) connector connected to a source apparatus via an HDMI (registered trademark) cable;

a changer which changes a signal output to the source apparatus from a hot plug detect (HPD) terminal to a level Hi when the changer receives a connection signal for communicating with the source apparatus via the HDMI (registered trademark) cable, the HPD terminal being included in the HDMI (registered trademark) connector, and changes the signal output from the HPD terminal to the source apparatus to a level Lo when the signal output from the HPD terminal to the source apparatus is at the level Hi and the video based on the video stream is displayed on the display; and a determiner which determines whether at least part of a communication bandwidth containing harmonic components of communication with the source apparatus via the HDMI (registered trademark) cable overlaps a communication bandwidth of the video stream received from the tuner apparatus, wherein the changer changes the signal output from the HPD terminal to the source apparatus to the level Lo when the signal output from the HPD terminal to the source apparatus is at the level Hi and the determiner determines that the at least part of the communication bandwidth containing harmonic components of communication with the source apparatus via the HDMI (registered trademark) cable overlaps the communication bandwidth of the video stream.

\* \* \* \* \*